United States Patent
Araki

(10) Patent No.: US 10,421,516 B2
(45) Date of Patent: Sep. 24, 2019

(54) VEHICLE

(71) Applicant: EQUOS RESEARCH CO., LTD., Tokyo (JP)

(72) Inventor: Keizo Araki, Tokyo (JP)

(73) Assignee: EQUOS RESEARCH CO., LTD., Tokyo (JP)

(*) Notice: Subject to any disclaimer, the term of this patent is extended or adjusted under 35 U.S.C. 154(b) by 0 days.

(21) Appl. No.: 15/763,388

(22) PCT Filed: Mar. 15, 2017

(86) PCT No.: PCT/JP2017/010516
§ 371 (c)(1),
(2) Date: Mar. 26, 2018

(87) PCT Pub. No.: WO2017/169806
PCT Pub. Date: Oct. 5, 2017

(65) Prior Publication Data
US 2018/0281887 A1    Oct. 4, 2018

(30) Foreign Application Priority Data
Mar. 31, 2016  (JP) .................................. 2016-071392

(51) Int. Cl.
*B62K 5/08* (2006.01)
*B62K 5/10* (2013.01)
(Continued)

(52) U.S. Cl.
CPC .................. *B62K 5/10* (2013.01); *B62K 5/05* (2013.01); *B62K 5/08* (2013.01); *B62K 21/02* (2013.01);
(Continued)

(58) Field of Classification Search
CPC ... B62K 5/10; B62K 5/05; B62K 5/08; B62K 21/02; B62K 25/24; B62K 2005/001; B62H 7/00; B60G 21/05
(Continued)

(56) References Cited

U.S. PATENT DOCUMENTS 4,410,196 A    10/1983  Ribi
4,887,829 A *  12/1989  Prince .................... B60G 21/05
                                              280/282
(Continued)

FOREIGN PATENT DOCUMENTS

CN    101537866 A    9/2009
CN    102092435 A    6/2011
(Continued)

OTHER PUBLICATIONS

Apr. 18, 2017 Search Report issued in International Patent Application No. PCT/JP2017/010516.
(Continued)

*Primary Examiner* — Joseph M Rocca
*Assistant Examiner* — Daniel S Yeagley
(74) *Attorney, Agent, or Firm* — Oliff PLC

(57) ABSTRACT

A vehicle in which traveling can be stabilized and the risk of overturning can be reduced, a vehicle with a pair of first suspension arms, a pair of second suspension arms connected to the pair of first suspension arms via a pair of joints, a pair of shock absorbers for connecting the pair of first suspension arms and pair of second suspension arms, a pair of forks as to allow turning about a steering axis with respect to the pair of second suspension arms, a pair of front wheels arranged on the pair of forks, a vehicle body to which the pair of front wheels are included, and a leaning part for leaning the vehicle body. The tread width increases as the vehicle body is leaned by the leaning part.

1 Claim, 2 Drawing Sheets

(51) Int. Cl.
  *B62K 5/05*    (2013.01)
  *B62K 21/02*   (2006.01)
  *B62K 25/24*   (2006.01)
  *B62K 5/00*    (2013.01)

(52) U.S. Cl.
  CPC ........ *B62K 25/24* (2013.01); *B62K 2005/001* (2013.01)

(58) Field of Classification Search
  USPC .......................................................... 280/267
  See application file for complete search history.

(56) References Cited

U.S. PATENT DOCUMENTS

| | | |
|---|---|---|
| 5,810,383 A | 9/1998 | Anderson |
| 2010/0133772 A1 | 6/2010 | Marabese et al. |
| 2011/0298191 A1 | 12/2011 | Pozio |
| 2011/0304117 A1* | 12/2011 | Aloni ........................ B62H 7/00 280/211 |

FOREIGN PATENT DOCUMENTS

| | | |
|---|---|---|
| CN | 102202921 A | 9/2011 |
| CN | 102458972 A | 5/2012 |
| GB | 2374327 A | 10/2002 |
| GB | 2480639 A | 11/2011 |
| JP | 2007-153024 A | 6/2007 |
| JP | 2009-544516 A | 12/2009 |
| JP | 2013-071688 A | 4/2013 |
| JP | 2013-208974 A | 10/2013 |
| JP | 2015-120360 A | 7/2015 |

OTHER PUBLICATIONS

May 7, 2019 Office Action issued in Chinese Patent Application No. 201780003173.0.

* cited by examiner

VEHICLE

TECHNICAL FIELD

The present invention relates to a vehicle having a vehicle body provided with three or more wheels including a steered wheel having a trail.

BACKGROUND ART

In recent years, fuel saving for vehicles is strongly required in view of energy resource depletion problem. On the other hand, the number of vehicle owners is being increased due to reduction in price of vehicles, and there is a tendency that one person owns one vehicle. Thus, it is often the case that, for example, only one person (driver) rides in a 4-seater vehicle, causing energy to be wastefully consumed. In order to achieve fuel saving by miniaturization of a vehicle, designing a vehicle as a one-person vehicle with three or four wheels is most efficient.

However, stability of such a vehicle may be deteriorated depending on a traveling state of the vehicle. In order to cope with this, there is proposed a technique in which a vehicle body is leaned laterally to improve stability of a vehicle at turning.

Patent Document 1 (JP 2013-71688A) discloses a vehicle provided with a configuration for leaning a vehicle body. In this vehicle, the leaning angle of the vehicle body and the actual steering angle of a steered wheel are calculated based on an input to a steering part and detected values of a vehicle speed sensor and a lateral acceleration sensor, and a dedicated motor is used to change the leaning angle and actual steering angle.

DISCLOSURE OF THE INVENTION

Problems to be Solved by the Invention

In the vehicle described in Patent Document 1, the leaning angle of the vehicle body and the actual steering angle of the steered wheel are changed by a motor based on an input to the steering wheel and detected values of the vehicle speed sensor and lateral acceleration sensor, so that the actual steering angle can be stabilized even at a low speed, whereby stable traveling can be achieved in the whole vehicle speed region.

However, when the height of a vehicle is relatively high as compared to the tread as in the vehicle described in Patent Document 1, traveling of a vehicle may become unstable.

Means for Solving the Problems

To solve the above problem, a vehicle according to the present invention includes a pair of first suspension arms, a pair of second suspension arms connected to the pair of first suspension arms via a pair of joints, a pair of attenuation devices that connect the pair of first suspension arms and the pair of second suspension arms, a pair of forks provided so as to allow turning about a steering axis with respect to the pair of second suspension arms, a pair of front wheels arranged on the pair of forks, a vehicle body to which the pair of front wheels are provided, and a leaning part for leaning the vehicle body. The tread width increases as the vehicle body is leaned by the leaning part.

Advantages of the Invention

In the vehicle according to the present invention, as the vehicle body is leaned by the leaning part, the tread width increases. Thus, according to the vehicle of the present invention having such a configuration, the tread width increases as necessary, whereby traveling is stabilized, and the risk of overturning can be reduced.

BEST MODE FOR CARRYING OUT THE INVENTION

Hereinafter, an embodiment of the present invention will be described with reference to the drawings.

Figure 1:
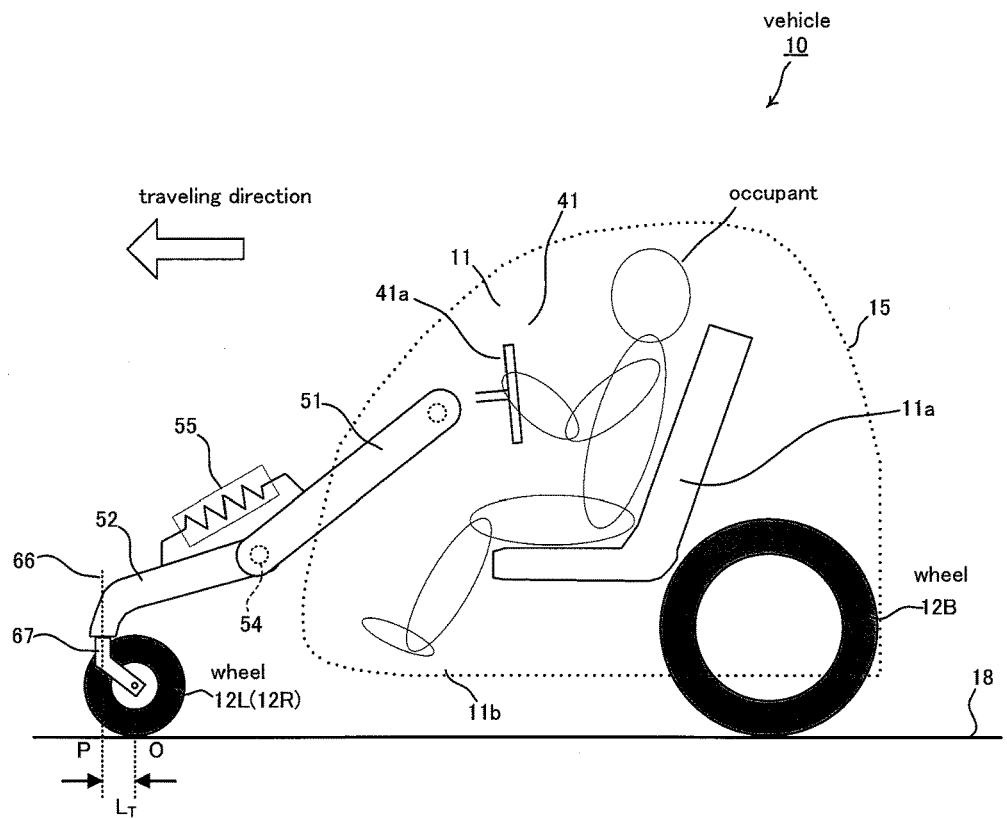
FIG. 1 is a left side view of a vehicle 10 according to an embodiment of the present invention.
Figure 2:
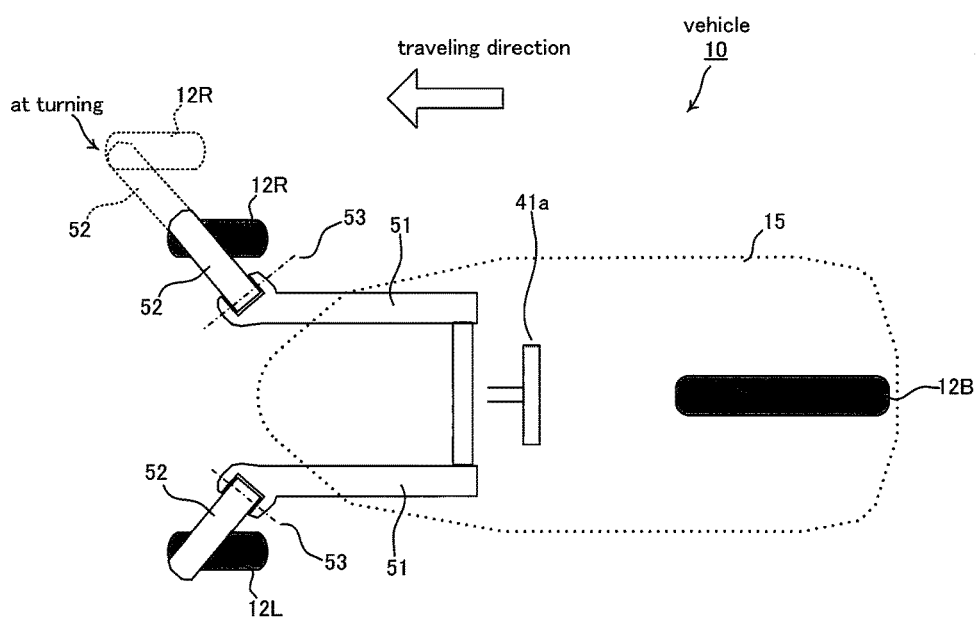
FIG. 2 is a top view of the vehicle 10 according to the embodiment of the present invention.
Figure 3:
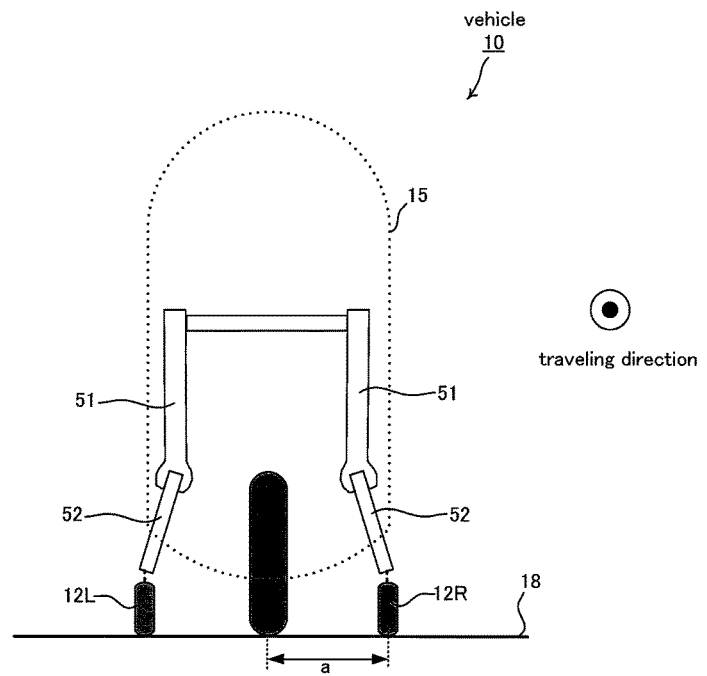
FIG. 3 is a rear view of the vehicle 10 according to the embodiment of the present invention.

FIG. 1 is a left side view of a vehicle 10 according to the embodiment of the present invention. FIG. 2 is a top view of the vehicle 10 according to the embodiment of the present invention. FIG. 3 is a rear view of the vehicle 10 according to the embodiment of the present invention.

In the drawings, the reference numeral 10 denotes a vehicle employed in the present embodiment. The vehicle 10 has a drive part (not illustrated) of a vehicle body 15, a cabin part 11 in which an occupant sits and steers the vehicle, left and right wheels 12L and 12R which are front wheels disposed at the front side of the vehicle and serve as steered wheels capable of being leaned and steered, and a wheel 12B, which is a rear wheel disposed at the rear of the vehicle body and at the width direction center thereof and serves as a driven wheel and a non-steered wheel not being capable of being steered.

The vehicle 10 further has a leaning mechanism for leaning the vehicle body 15 to the left and right, i.e., a vehicle body leaning mechanism that leans suspension arms supporting the respective left and right wheels 12L and 12R to thereby lean the vehicle body 15. The learning mechanism includes a joint 54 connecting the second suspension arm 52 and first suspension arm 51 such that they can be turned with respect to each other about a turning axis 53.

Basically, in the vehicle 10 according to the present invention, the vehicle 10 is turned by changing the leaning angle of the vehicle body 15. That is, in the vehicle 10, the vehicle body 15 including the cabin part 11 is leaned to the turning inner wheel side to thereby improve turning performance and secure comfortability for the occupant.

That is, in the vehicle 10, the vehicle body 15 can be leaned laterally (left-right direction). In the example illustrated in FIG. 3, the left and right wheels 12L and 12R are each in an upright state with respect to a road surface 18.

A seat 11a in the cabin part 11 is a part on which the occupant sits during traveling of the vehicle 10. A footrest 11b is a part for supporting the foot of the occupant and is provided at the lower part of the front side (right side in FIG. 1) of the seat 11a.

A battery device (not illustrated) is provided rearward or downward of the cabin part 11. The battery device serves as an energy supply source for a rotary driving device or the like that drives the driven wheel 12B into rotation. Further, a controller (not illustrated), an inverter device, various sensors, and the like are provided rearward or downward of the cabin part 11.

A maneuvering device 41 is provided forward of the seat 11a. The maneuvering device 41 is provided with members required for maneuvering, such as a handle 41a serving as a steering device that the occupant operates to input steering command information such as a steering direction, steering angle, or the like, a meter such as a speed meter, an indicator, and a switch.

The occupant operates the handle 41a and other members to give instructions as to the traveling state (e.g., traveling direction, traveling speed, turning direction, and turning radius) of the vehicle 10. As the steering device, a device such as a steering wheel, a jog dial, a touch panel, or a push button may be used in place of the handle 41a.

The wheels 12L and 12R are connected to a pair of second suspension arms 52, respectively, via a pair of forks 67 constituting a part of a suspension device. The left and right forks 67 are fixed to the pair of second suspension arms 52, respectively, so as to be each turnable about a steering axis 66.

The second suspension arm 52 is connected to the first suspension arm 51 via a joint 54. The joint 54 connects the second suspension arm 52 and first suspension arm 51 such that they can be turned with respect to each other about a turning axis 53.

Further, the first suspension arm 51 and the second suspension arm 52 are connected to each other by a shock absorber 55 as an attenuation device, in addition to the joint 54. The shock absorber 55 is illustrated schematically only in FIG. 1 and omitted in other drawings.

A predetermined trail $L_T$ exists between an intersection P between the steering axis 66 of the wheel 12R, 12L and a road surface and a contact point O, and the turnable left and right wheels 12R and 12L are automatically steered following the camber angles of the wheels 12R and 12L. In the vehicle 10 according to the preset embodiment, the intersection P between (the extension line of) the steering axis 66 of each of the wheels 12R and 12L and the road surface is positioned forward of the contact point O of each of the steering wheels.

The turning of each of the wheels 12R and 12L refers not to rotation of each of the wheels 12R and 12L itself during traveling of the vehicle 10, but to motion of each of the wheels 12R and 12L based on turning about the steering axis 66 thereof.

The handle 41a is connected to the upper end of a steering axis member (not illustrated), and the upper end of the steering axis member is rotatably fixed to a frame member (not illustrated) provided in the cabin part 11.

A rotation angle of the upper end of the steering axis member with respect to the frame member, i.e., a handle angle as a steering angle command value that the occupant inputs by operating the handle 41a is detected by a handle operation angle sensor (not illustrated) as an input steering angle detection means. The handle operation angle sensor is e.g., an encoder.

In the vehicle 10 according to the present invention, a lean angle is determined based on a handle angle detected by the handle operation angle sensor and a vehicle speed detected by a vehicle speed sensor. Then, the vehicle body 15 is leaned based on the determined lean angle by a vehicle body leaning mechanism to thereby turn the vehicle 10.

When the distance between the wheels 12R and 12L is relatively smaller as compared to the vehicle height of the vehicle 10, traveling of the vehicle 10 may become unstable.

Thus, at turning, the vehicle 10 according to the present invention performs such an operation as to increase the tread width so as to reduce the possibility of unstable traveling.

Figure 4:
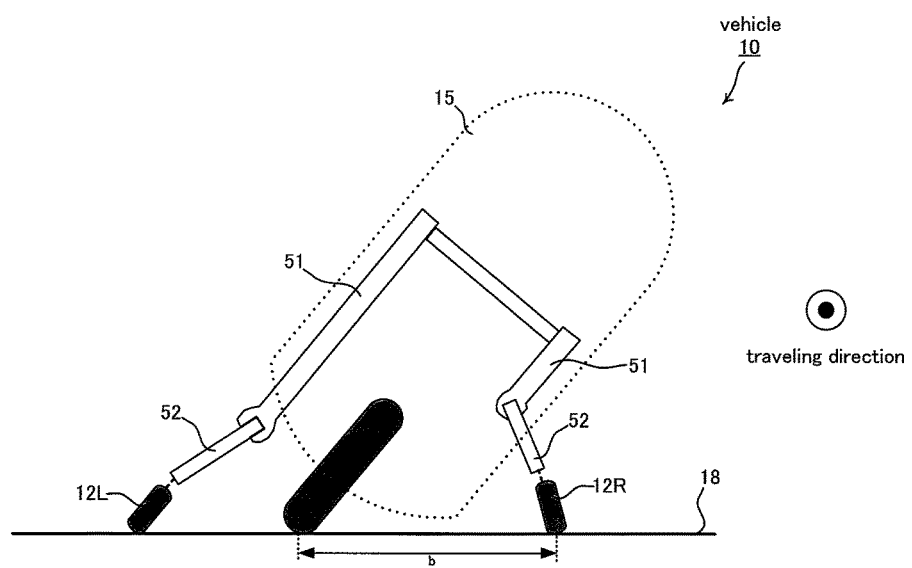
FIG. 4 is a rear view illustrating a state of the vehicle 10 according to the embodiment of the present invention at turning.

FIG. 4 is a rear view illustrating a state of the vehicle 10 according to the embodiment of the present invention at turning. FIG. 4 illustrates a state where the vehicle 10 is turned to the right with a right rotation of the handle 41a. At this time, in the vehicle 10 according to the present invention, the wheel 12L connected to the second suspension arm 52 is moved to the left from its regular position as denoted by the dotted line of FIG. 2 such that the tread width between the wheels increases. Further, the wheel 12L is configured to be steered by the fork 67, so that it is steered following the lean of the vehicle body 15, whereby the vehicle 10 can perform desired turning operation.

In an upright state of the vehicle body 15 illustrated in FIG. 3, the tread width between the wheels 12L and 12B is "a", while in a leaned state of the vehicle body 15 illustrated in FIG. 4, the tread width between the wheels 12L and 12B is "b" which is larger than "a". This makes it possible to avoid a situation where traveling at turning becomes unstable due to relatively smaller tread width as compared to the vehicle height of the vehicle 10.

The second suspension arm 52 is connected to the first suspension arm 51 via the shock absorber 55, so that when the handle 41a is rotated for turning operation, the tread width increases with the second suspension arm 52 gently separated from the vehicle body 15 in the vehicle width direction.

Further, also when the handle 41a is turned for switching from the turning state to a straight traveling state to return the vehicle body 10 from the leaned state to upright state, the second suspension arm 52 gently becomes close to the vehicle body 15 by attenuation effect of the shock absorber 55, whereby the tread width reduces.

In the vehicle 10 according to the present invention, when the vehicle body 15 is leaned to change the tread width, the wheels 12L and 12R each having the caster trail and the shock absorber 55 smoothly absorb a change caused due to increase/decrease in the tread width, whereby both turning performance and straight traveling performance can be improved.

As described above, in the vehicle 10 according to the present invention, as the vehicle body 15 is leaned by the vehicle body leaning mechanism (leaning part), the tread width increases. Thus, according to the vehicle 10 of the present invention having such a configuration, the tread width increases as necessary, whereby traveling is stabilized, and the risk of overturning can be reduced.

INDUSTRIAL APPLICABILITY

In recent years, various efforts have been made to cope with energy problems by designing a vehicle as a small-size vehicle such as a one-person vehicle with three or four wheels. Conventionally, in such a small-size vehicle, the vehicle height is relatively larger as compared to the tread, which may make traveling unstable. On the other hand, in the vehicle according to the present invention, as the vehicle body is leaned by the leaning part, the tread width increases. Thus, according to the vehicle of the present invention having such a configuration, the tread width increases as necessary, whereby traveling is stabilized, and the risk of overturning can be reduced, and thus, the industrial applicability is very high.

REFERENCE SIGNS LIST

10: Vehicle
11: Cabin part

11a: Seat
11b: Footrest
15: Vehicle body
12B: Wheel
12R: Wheel
12L: Wheel
41a: Handle
51: First suspension arm
52: Second suspension arm
53: Turning axis
54: Joint
55: Shock absorber (attenuation device)
66: Steering axis
67: Fork

The invention claimed is:
1. A vehicle comprising:
a pair of first suspension arms;
a pair of second suspension arms connected to the pair of first suspension arms via a pair of joints;
a pair of attenuation devices that connect the pair of first suspension arms and the pair of second suspension arms;
a pair of forks provided so as to allow turning about a steering axis with respect to the pair of second suspension arms;
a pair of front wheels arranged on the pair of forks;
a vehicle body to which the pair of front wheels are provided; and
a leaning part comprising a turning axis for leaning the vehicle body, wherein
a tread width of the pair of front wheels increases as the vehicle body is leaned by the leaning part.

* * * * *